(12) United States Patent
Ohta (10) Patent No.: US 8,878,948 B2
(45) Date of Patent: Nov. 4, 2014

(54) VIBRATION CORRECTING DEVICE

(75) Inventor: Seiya Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 12/496,567

(22) Filed: Jul. 1, 2009

(65) Prior Publication Data

US 2010/0002088 A1 Jan. 7, 2010

(30) Foreign Application Priority Data

Jul. 4, 2008 (JP) ................................. 2008-175912

(51) Int. Cl.
*H04N 5/228* (2006.01)
*H04N 5/232* (2006.01)

(52) U.S. Cl.
CPC ...... *H04N 5/23248* (2013.01); *H04N 5/232551* (2013.01); *H04N 5/23264* (2013.01); *H04N 5/2328* (2013.01)
USPC ................ 348/208.99; 348/208.2; 348/208.4; 348/208.5; 348/208.7

(58) Field of Classification Search
CPC .......... H04N 5/23248; H04N 5/23251; H04N 5/23264
USPC ........ 348/208.99, 208.1, 208.2, 208.3, 208.4, 348/208.5, 208.6, 208.7, 208.12, 208.13, 348/208.16, 373, 374, 375
See application file for complete search history.

(56) References Cited

U.S. PATENT DOCUMENTS

| 5,852,749 | A | * | 12/1998 | Konno et al. ................... 396/55 |
| 5,861,915 | A | | 1/1999 | Sato et al. |
| 6,208,377 | B1 | * | 3/2001 | Morofuji et al. ........... 348/208.8 |
| 6,233,009 | B1 | * | 5/2001 | Morofuji et al. ........... 348/208.8 |
| 7,465,107 | B2 | * | 12/2008 | Washisu et al. ............... 396/351 |
| 7,791,643 | B2 | * | 9/2010 | Stavely ..................... 348/208.2 |
| 2002/0051635 | A1 | | 5/2002 | Morofuji |
| 2004/0056963 | A1 | | 3/2004 | Ishikawa |
| 2005/0057662 | A1 | | 3/2005 | Washisu |
| 2005/0254805 | A1 | | 11/2005 | Moriya et al. |
| 2006/0233539 | A1 | | 10/2006 | Kubo |

FOREIGN PATENT DOCUMENTS

| CN | 1140949 A | 1/1997 |
| CN | 1142155 A | 2/1997 |
| CN | 1920689 A | 2/2007 |
| CN | 1932586 A | 3/2007 |
| JP | 05-066451 | 3/1993 |
| JP | 2003307762 A | 10/2003 |
| JP | 2004-248309 | 9/2004 |
| JP | 2008-003327 A | 1/2008 |

* cited by examiner

*Primary Examiner* — Twyler Haskins
*Assistant Examiner* — Peter Chon
(74) *Attorney, Agent, or Firm* — Canon USA, Inc. IP Division (57) ABSTRACT

A vibration correcting device includes a vibration detecting unit, a vibration correcting unit, a storage unit, and a controlling unit. The vibration detecting unit is configured to detect vibration of an image pickup apparatus. The vibration correcting unit is configured to correct blur of an image caused by the vibration. A storage unit is configured to store correction information used for correcting the blur at a predetermined frequency. The controlling unit is configured to, on the basis of the correction information, send a control signal to the vibration correcting unit.

10 Claims, 7 Drawing Sheets

FIG. 7 they are not places that do not vibrate at all. That is, they may undergo very small vibrations having various frequency components. It is known that, when a shooting device having a resonance characteristic is set, the amplitude of the vibration of the shooting device increases at a certain natural frequency, thereby causing an image to become blurred.

VIBRATION CORRECTING DEVICE

BACKGROUND OF THE INVENTION

1. Field of the Invention

The present invention relates to a vibration correcting device suitable for use in an optical apparatus, or a shooting device of, for example, a shooting apparatus.

2. Description of the Related Art

As a vibration correcting device, as in U.S. Pat. No. 6,208,377 and U.S. Pat. No. 6,233,009, there is a vibration correcting device including a frequency vibration detecting unit, which detects vibration frequency, and a vibration correcting unit. The vibration correcting device provides a suitable vibration correction effect by correcting a phase displacement of frequency characteristics.

In recent years, maintenance of information infrastructure or security has increased the necessity of setting shooting devices. Among such shooting devices, there is an increasing need for shooting devices that can be used for high magnification. In addition, there is an increasing need for a vibration correction function.

When a shooting device is set to, for example, a floor, a wall, or a ceiling, the shooting device may resonate at a frequency that is characteristic of the shooting device due to, for example, setting conditions or manufacturing errors of the shooting device. In particular, shooting devices provided with movable sections having pan/tilt driving mechanisms tend to resonate at their natural frequencies. Although the causes thereof depend upon the shooting devices, it may be said that there are various causes, such as the mass and rattling form in a gap of the movable section.

Figure 3:
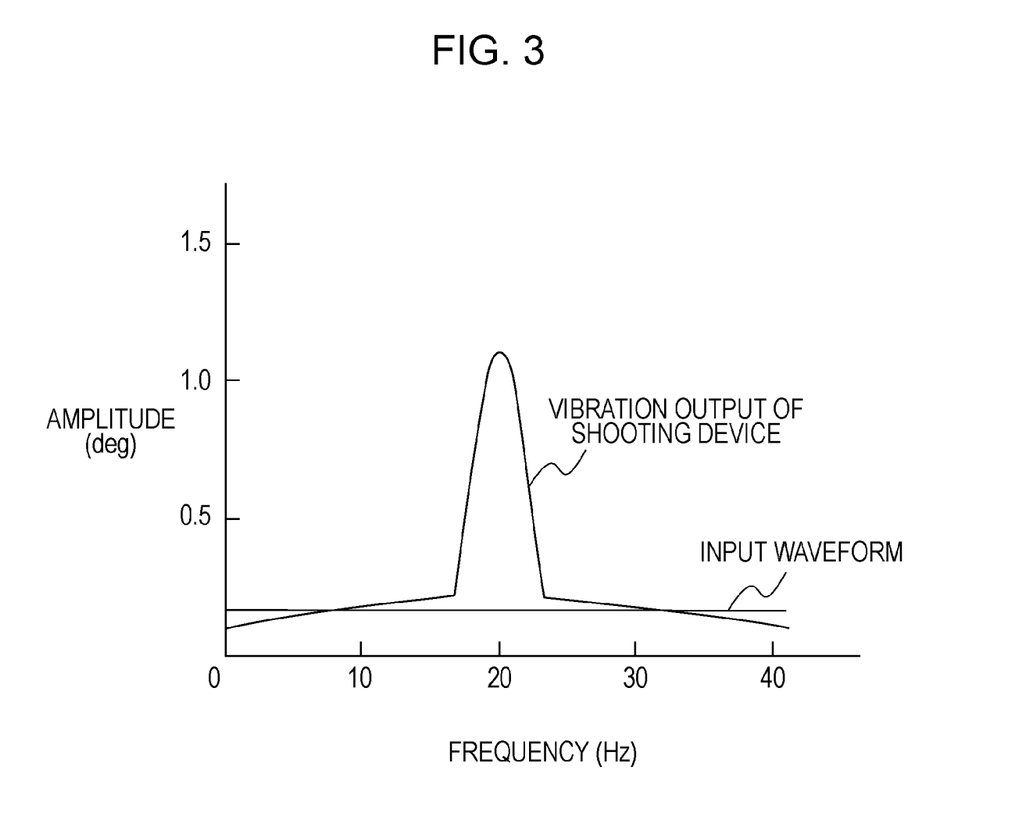
FIG. 3 illustrates the results of measurements of natural vibration frequencies by a vibration tester in the Example 1 and with reference to the aforementioned situation.

FIG. 3 shows the result of setting a shooting device, inputting various frequencies having the same amplitude, and measuring the vibrations of the shooting device. The horizontal axis represents the frequency, and the vertical axis represents the amplitude. From FIG. 3, it can be understood that, when the input has a certain amplitude, the amplitude of the shooting device increases at a predetermined frequency. This means that the amplitude of the vibration of the shooting device is increasing with respect to the vibration at this frequency. It may be said that resonant frequency corresponds to the aforementioned natural frequency. In general, for example, ceilings are places where vibration is low. However, they are not places that do not vibrate at all. That is, they may undergo very small vibrations having various frequency components. It is known that, when a shooting device having a resonance characteristic is set, the amplitude of the vibration of the shooting device increases at a certain natural frequency, thereby causing an image to become blurred.

SUMMARY OF THE INVENTION

According to an aspect of the present invention, there is provided a vibration correcting device comprising a vibration detecting unit configured to detect vibration of an image pickup apparatus, a vibration correcting unit configured to correct blur of an image caused by the vibration, a storage unit configured to store correction information used for correcting the blur at a predetermined frequency, and a controlling unit configured to, on the basis of the correction information, send a control signal to the vibration correcting unit, without detecting a frequency of the vibration of the image pickup apparatus.

According to another aspect of the present invention, there is provided an optical apparatus comprising a driving unit configured to change a shooting state, a vibration detecting unit to detect vibration, a vibration correcting unit, a shooting state detecting unit configured to obtain information about the shooting state, a storage unit configured to store correction information corresponding to the detected vibration, and a controlling unit configured to, on the basis of the correction information, send a control signal to the vibration correcting unit.

Further features of the present invention will become apparent from the following description of examples with reference to the attached drawings.

DESCRIPTION OF THE EMBODIMENTS

Example 1

Figure 1:
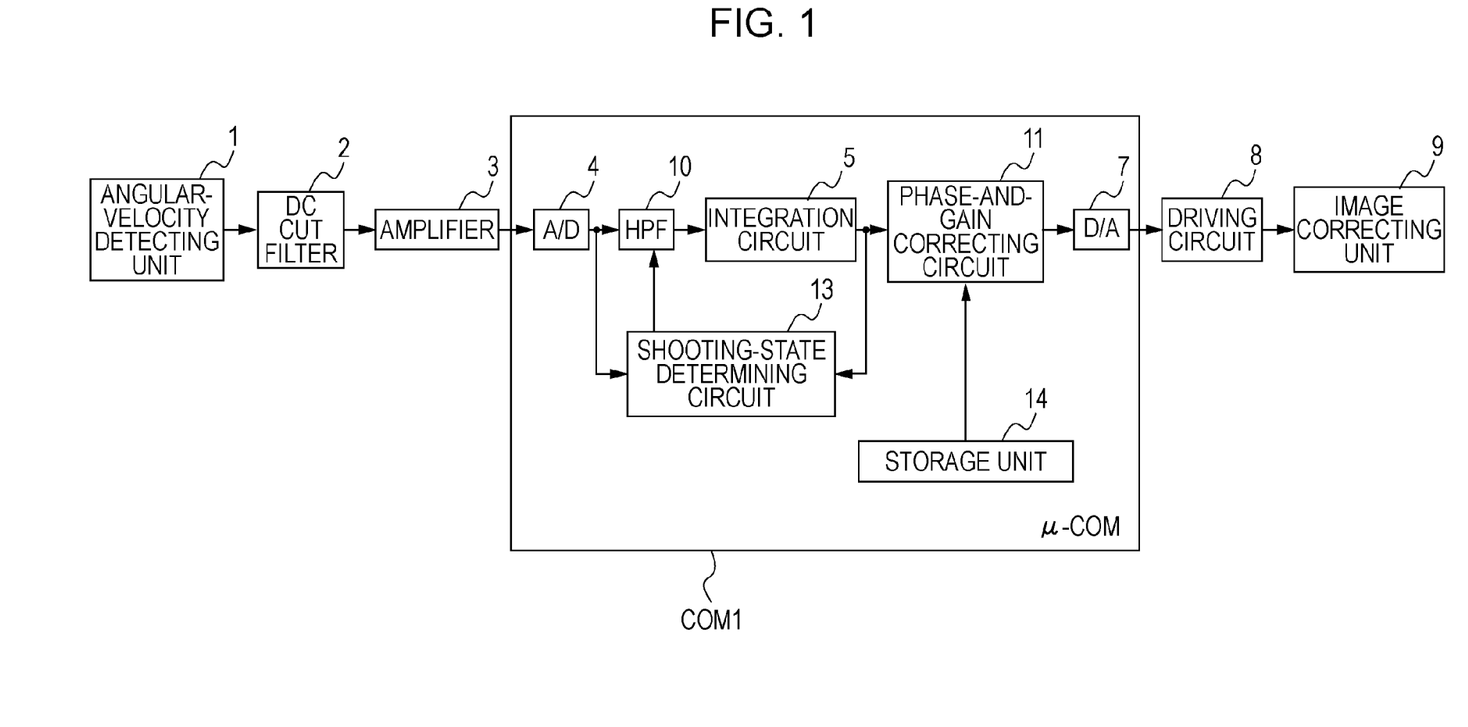
FIG. 1 is a block diagram of Example 1 of the present invention.

FIG. 1 is a block diagram of a main structure of a vibration correcting device according to Example 1 of the present invention. As mentioned above, the vibration correcting device is built in an optical apparatus, such as a camera system, a camera body to which a lens unit is mountable, the lens unit, or an image pickup apparatus. The optical apparatus may optionally have a driving unit to change a shooting state.

Reference numeral 1 denotes an angular-velocity detecting unit, and is mounted to a vibration correction shooting device of, for example, a shooting apparatus. The angular-velocity detecting unit includes an angular velocity sensor, such as a vibrating gyroscope. Reference numeral 2 denotes a DC cut filter that intercepts a direct-current component of a velocity signal, output from the angular-velocity detecting unit 1, and allows only an alternating-current component (that is, a vibration component) to pass therethrough. The DC cut filter may be a bypass filter (hereunder referred to as "HPF") that intercepts a signal at any bandwidth. Reference numeral 3 denotes an amplifier that amplifies an angular velocity signal, output from the DC cut filter, to one providing a suitable sensitivity.

Reference numeral 4 denotes an A/D converter that converts the angular velocity signal output from the amplifier 3 into a digital signal. Reference numeral 5 denotes an integrator that integrates an output of the A/D converter 4 and outputs an angular displacement signal.

Reference numeral 6 denotes a pan/tilt determining circuit that determines panning/tilting from an integration signal of the angular velocity signal (that is, the angular displacement signal) output from the integration circuit 5.

Reference numeral 7 denotes a D/A converter that converts the output of the pan/tilt determining circuit into, for example, a PWM pulse output or an analog signal.

The A/D converter 4, the integrator 5, the pan/tilt determining circuit 6, and the D/A converter 7 are formed by, for example, a microcomputer COM1.

Reference numeral 8 denotes a driving circuit that performs driving so that vibration of a following image correcting unit is restricted on the basis of the displacement signal output from the microcomputer.

Reference numeral 9 denotes the image correcting unit, which uses, for example, an optical correcting unit that cancels vibration by displacing an optical axis, or an electronic correcting unit that cancels vibration by electronically shifting an image readout position using a memory in which an image is stored.

In the microcomputer COM1, the A/D converter 4 converts the angular velocity signal output from the amplifier 3 into a digital signal. An HPF 10 is changeable at any bandwidth. The integration circuit 5 integrates a predetermined frequency-component signal extracted by the HPF 10, and determines an angular displacement signal at the frequency component. A phase-and-gain correcting circuit 11 corrects the phase and gain of the integration signal (that is, the angular displacement signal) output from the integration circuit 5. From the angular velocity signal and the angular displacement signal, a shooting-state determining circuit 12 determines a shooting state including, for example, stationary state/panning/tilting, and controls the characteristics of the HPF 10 in accordance with the shooting state.

A storage unit 14 stores correction coefficients, which are correction information of the phase-and-gain correcting circuit 11 corresponding to natural vibration frequencies of the image pickup apparatus used in the example. During correction, the correction coefficients are read out to the phase-and-gain correcting circuit 11. Then, using the correction coefficients, the phase-and-gain correcting circuit 11 corrects the phase and gain of the angular displacement signal output from the integration circuit 5. The D/A converter 7 converts the output signal of the phase-and-gain correcting circuit 11 into, for example, a PWM pulse output or an analog signal, and outputs it.

The phase and gain characteristics differ depending upon the frequency of the vibration applied to the apparatus. Therefore, when a shooting apparatus having a natural vibration frequency is used, if the frequency is previously known, a suitable vibration correction effect is obtained by suitably setting the phase and gain.

A feature of the example is that the storage unit 14 stores the correction information for correcting vibration at a particular frequency applied to the image pickup apparatus, and that, using the correction information, a suitable vibration correction is performed on the vibration at the particular frequency, without detecting the frequency of the vibration of the image pickup apparatus.

Figure 2:
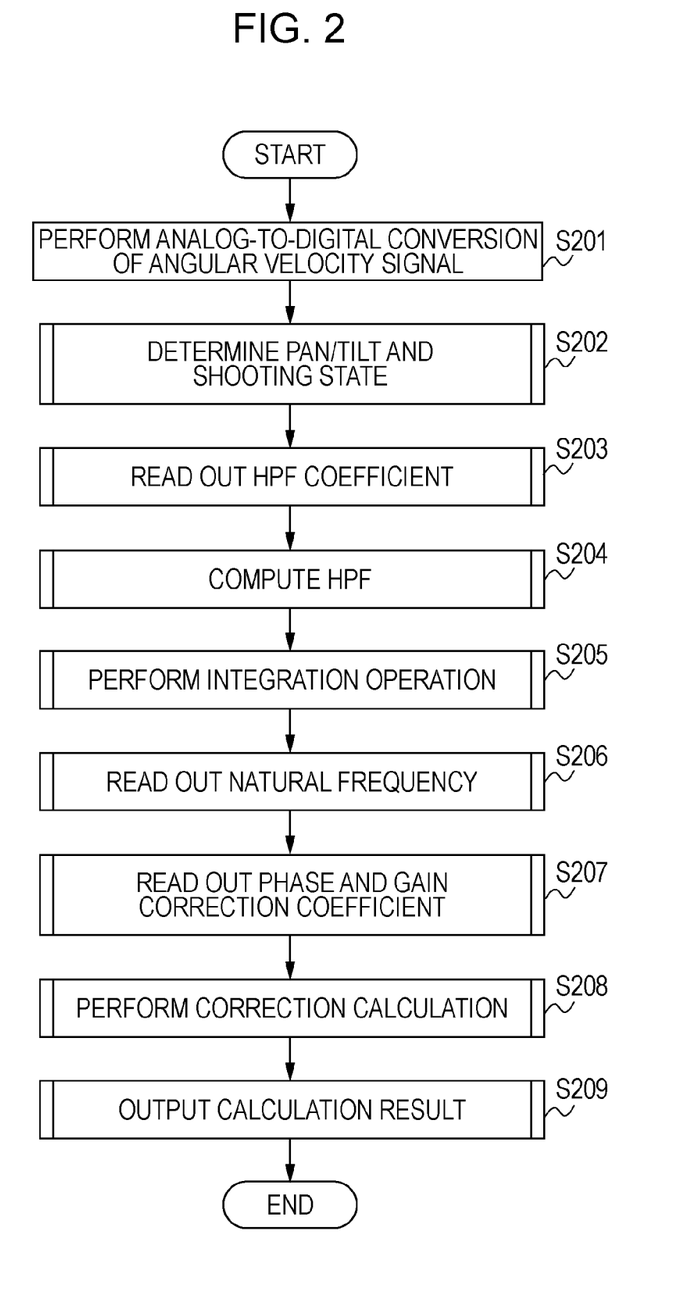
FIG. 2 is a flowchart of operations in the Example 1.

Next, the operations of the microcomputer COM1 according to the example shown in FIG. 1 will be described with reference to the flowchart of FIG. 2. When control is started, in Step S201, a direct-current component is removed through the DC cut filter 2 and the amplifier 3. In addition, the angular velocity signal that is output from the angular velocity detecting unit 1 and whose amplitude is increased to a predetermined level is converted into a digital signal by the A/D converter 4, and the digital signal is input to the microcomputer COM1.

Next, in Step S202, the angular velocity signal and the angular displacement signal, obtained by integrating a predetermined high-region component (extracted from the angular velocity signal by the HPF 10) by the integration circuit 5, are used to determine a shooting state. In Step S203, in accordance with the determination result, as mentioned above, a coefficient for setting the characteristics of the HPF 10 is read out from a table (not shown) previously provided in the microcomputer COM1. That is, if the HPF 10 is a digital filter, when a predetermined coefficient is read out from the table (in which the coefficient is stored) and is set, the characteristics of the HPF 10 can be freely changed. In Step S204, using the coefficient for setting the characteristics, the HPF 10 performs a calculation to set the characteristics. In Step S205, the integration circuit 5 performs integration on the signal output from the HPF 10, and converts the signal to an angular displacement signal (vibration signal).

In Step S206, a correction coefficient of the phase-and-gain correcting circuit 11 corresponding to the natural vibration frequency of the image pickup apparatus and stored in the storage unit 14 is read out from the table (not shown) previously provided in the microcomputer COM1.

The phase-and-gain correcting circuit 11 compensates for degradation of vibration correction characteristics resulting from a phase lag in a vibration correcting system. The phase-and-gain correcting circuit 11 includes, for example, a digital filter; reads out the correction coefficient of the digital filter; and sets phase and gain correction characteristics corresponding to the vibration frequency thereof.

In Step S207, correction computation is performed using the coefficient obtained in Step S206. In Step S208, the obtained calculation result, that is, the corrected angular displacement signal, is converted into an analog signal by the D/A converter 7, or is formed as, for example, a PWM pulse, and is output by the microcomputer COM1 (S209).

Accordingly, according to the example, since the correction information for correcting vibration at a particular frequency is stored, and the vibration is corrected on the basis of this information, it is possible to suitably correct the vibration at the particular frequency, such as vibration at a natural vibration frequency of the image pickup apparatus, or vibration characteristic of the environment in which the image pickup apparatus is set. As mentioned above, when a shooting device is set, in particular, when a shooting device provided with a movable section is set, the shooting device has the characteristic of resonating at its natural frequency. This natural frequency can be previously measured by vibrating the shooting device as a result of applying various frequencies at predetermined amplitudes.

When the shooting device is secured to an apparatus, such as a vibration tester, which can vibrate at any frequency and amplitude, and measurement is performed, the natural frequency thereof can be previously determined. By storing the natural vibration frequency obtained in this way in the storage unit 14, suitable vibration frequency control can be performed even if the shooting device vibrates at the natural frequency when the shooting device is set and secured.

The storage unit 14 that stores the correction coefficients for vibration at the natural vibration frequency may be a rewritable storage unit. By measuring the natural vibration frequency of the shooting device (for example, during shipment or in terms of lot unit), and writing the natural vibration frequency, it is possible to deal with variations in the natural vibration frequency of the device. In addition, the same effect can be obtained by storing possible correction coefficients for vibration at a plurality of frequencies, and selecting one of the possible correction coefficients. Further, the image pickup apparatus may be set at a place where vibration of the image pickup apparatus at a frequency that is equal to the natural vibration frequency of the image pickup apparatus is small, or at a place where the image pickup apparatus is affected by vibration at a particular frequency other than the natural vibration frequency. Even in such a case, it is possible to correct vibration so as to be suitable for the place where the image pickup apparatus is set, by previously specifying a main vibration frequency detected at the place where the image pickup apparatus is set and by storing a correction coefficient corresponding to this frequency in the storage unit 14.

Example 2

Figure 4:
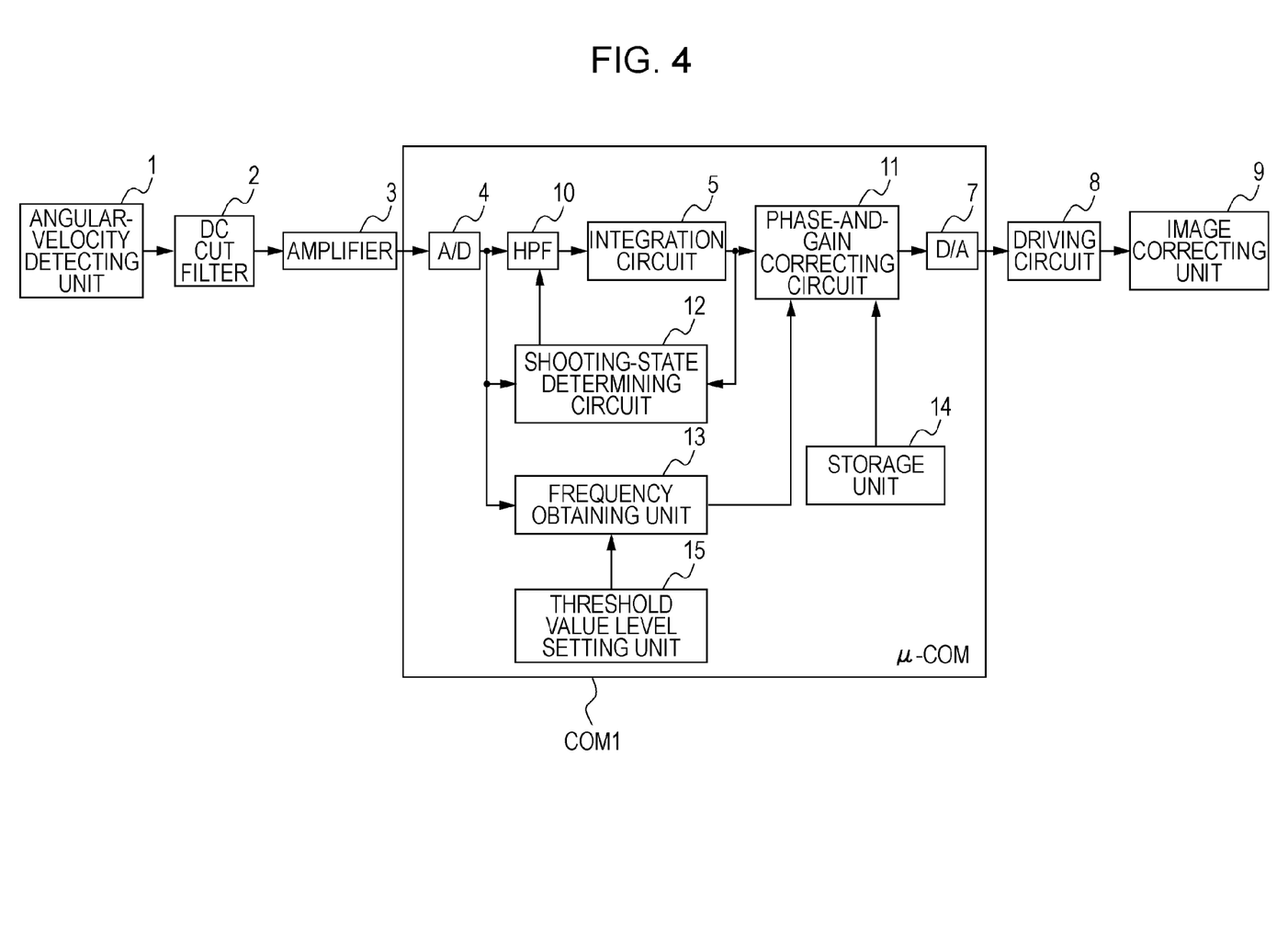
FIG. 4 illustrates Example 2 of the present invention.

FIG. 4 is a block diagram of a main structure of Example 2 of the present invention. In FIG. 4, parts corresponding to those of the Example 1 shown in FIG. 1 will be given the same reference numerals, and will not be described in detail below. In FIG. 4, reference numeral 15 denotes a threshold value level setting unit that sets a threshold value level a.

In the Example 2, a setting method in which the setting unit 15 that sets the threshold value level a of a frequency obtaining unit 13 is provided, and in which suitable detection of vibration applied to an image pickup apparatus at a location where a shooting device is set is allowed is proposed.

Figure 5A:
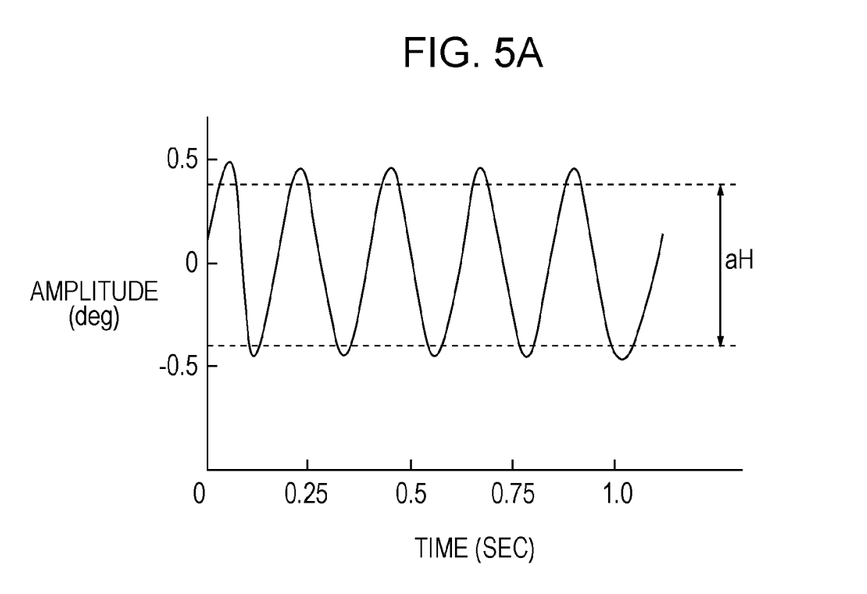
FIGS. 5A and 5B illustrate detection frequencies resulting from differences between frequency detection levels in the Example 2 of the present invention.
Figure 5B:
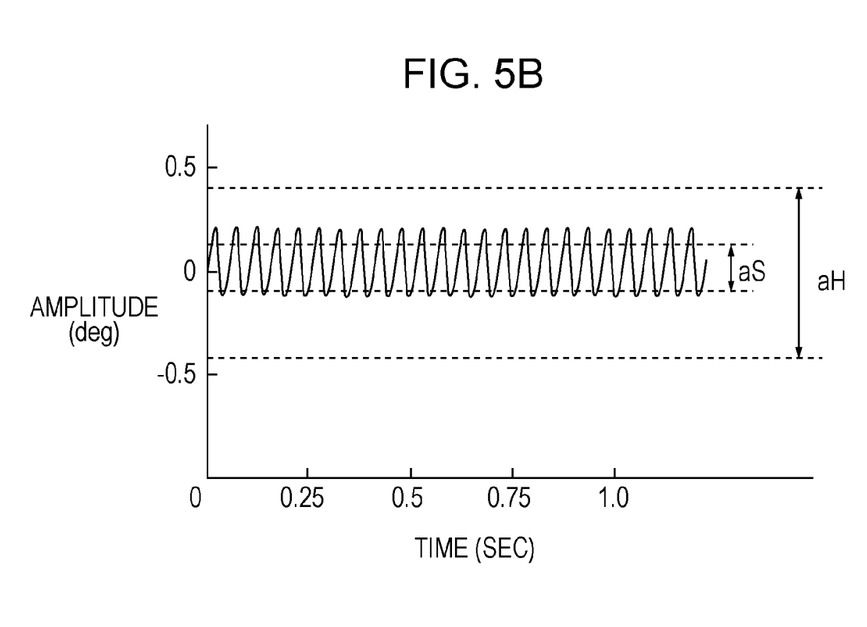

FIGS. 5A and 5B are graphs indicating levels "aH" and "aS", which are different threshold value levels "a" of the frequency obtaining unit 13 and an output sample of a vibration detecting unit. The horizontal axis represents time, and the vertical axis represents angular velocity, which corresponds to amplitude. FIG. 5A is the graph for when a vibration sample that is held by a person's hand, and FIG. 5B is the graph for the vibration sample that is set. The numbers of vibrations exceeding the threshold levels aH and aS in a predetermined time become detection frequencies at their respective threshold value levels. In the figure, the threshold value level aH is, for example, a threshold value level of the frequency obtaining unit 13 when the shooting device is held by a person's hand. Vibrations produced when the shooting device is held by a person's hand depend on individuals, and may include a combination of various frequencies.

In correcting vibration of the shooting device that is being held by a person's hand, when vibration having a low frequency and a large amplitude is corrected, a certain effect may be provided. In this case, when the threshold value level is set as indicated by aH in FIG. 5A, the frequency can be properly detected. By setting the threshold value level in this way, a frequency having a relatively large amplitude can be selected even when the hand is shaking, so that a suitable vibration correction effect can be obtained during shooting with the shooting device that is held by a person's hand.

When the shooting device is set, and the setting of the threshold value level "a" is made the same as that when the shooting device is held by a person's hand, a proper frequency detection result cannot be obtained. This is because, even if the shooting device resonates at a natural frequency due to being set or secured, the amplitude of the vibration is not necessarily large.

As shown in FIG. 5B, the vibration of the shooting device mounted to a ceiling is very small compared to that of the shooting device that is being held by a person's hand. Here, for example, when the threshold value level in FIG. 5B is the threshold value level aH that is set when the shooting device is held by a person's hand, the frequency detection result becomes one in which the frequency is very low. For example, the frequency is 2 Hz.

The set shooting device is actually vibrating at, for example, 20 Hz. Therefore, if phase and gain control is performed in accordance with the detected frequency of 2 Hz as described in the related art, phase displacement and gain are not suitable for the frequency of 20 Hz of the actual vibration. Therefore, residual vibration occurs.

Accordingly, first, the threshold value level is set to the level "aS", which is smaller than the threshold value level "aH", so that a frequency having a small amplitude can be detected. The frequency can be read in terms of the vibration of the shooting device from the figure. As mentioned above, when the shooting device is set, it is known that the shooting device resonates at a natural vibration frequency. The natural vibration frequency of the shooting device can also be previously measured. Next, an optimal vibration correction effect can be obtained by previously setting the natural vibration frequency, mounting the shooting device in a predetermined environment in which resonance occurs, and adjusting the threshold value level so that the natural vibration frequency can be detected. For example, the threshold value aS of this frequency is adjusted to obtain an output of 20 Hz.

Figure 7:
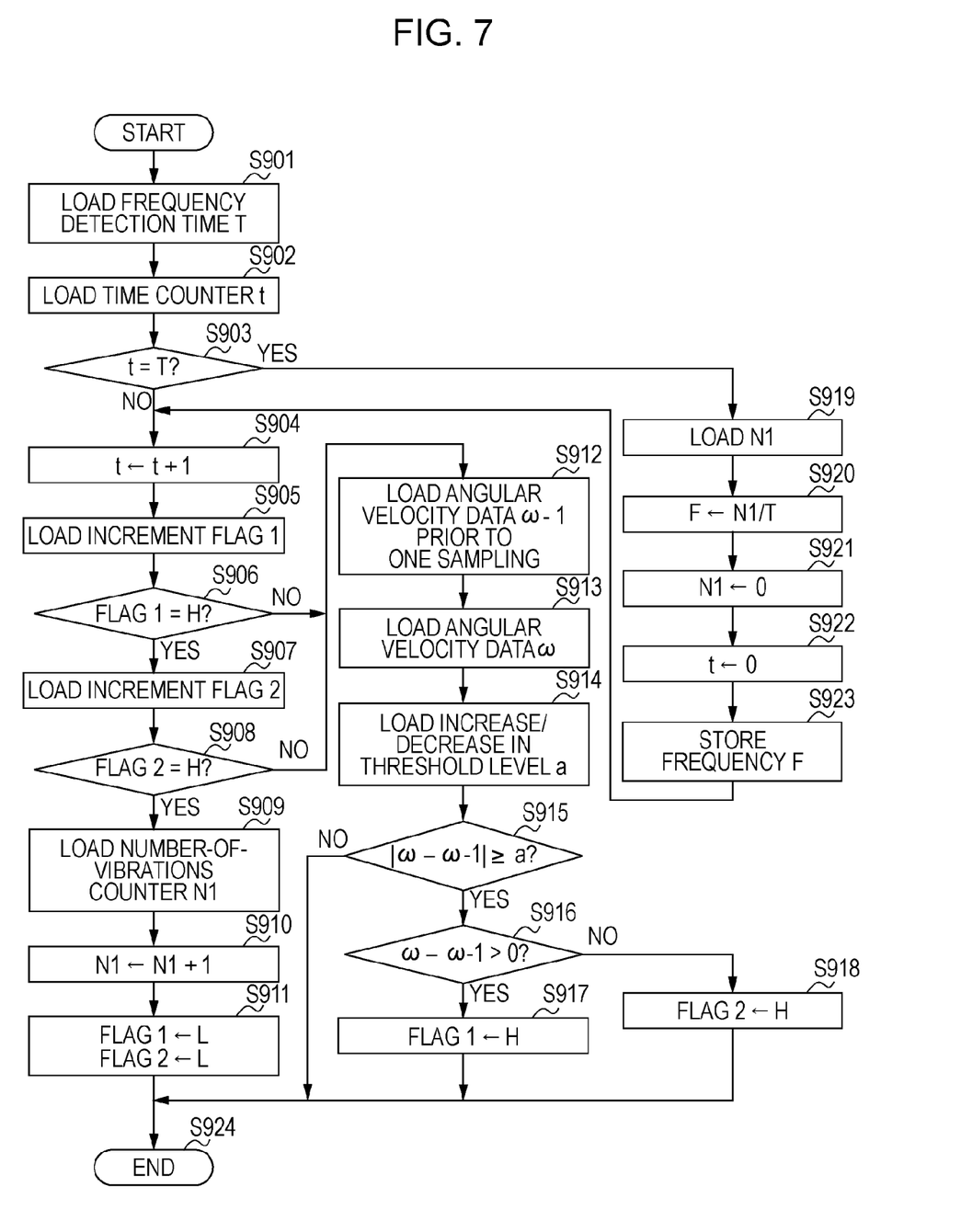
FIG. 7 is a flowchart of operations using a frequency obtaining unit in the Example 2.

First, an example of the process of detecting frequency, which is the center frequency of the vibration detected from the angular velocity detecting unit, by the frequency obtaining unit 13 will be described with reference to the flowchart of FIG. 7. This process is repeated once every predetermined amount of time.

In Step S901, a frequency detection time T is read out (is loaded). Then, in Step S902, a read-out operation of a clock counter t is started, that is, the counter starts counting. In Step S903, the frequency detection time T and the clock counter t are compared with each other. A determination is made as to whether or not the count value t of the clock counter has reached the predetermined time T. If the clock counter t has reached the predetermined time T, the process proceeds to Step S919. If not, the process proceeds to Step S904.

In Step S904, "1" is added to the clock counter. In Step S905, an increment flag 1 for checking whether or not there has previously been an increase in the level of the angular velocity signal is loaded. When there has previously been an increase, the increment flag is set to "H." In contrast, if not, the increment flag is set to "L."

In Step S906, when the flag 1 is used to determine whether or not the level of the angular velocity signal has been previously increased, and when the flag 1="H," it is determined that the level of the angular velocity signal has been previously increased, and the process proceeds to Step S907. If the flag 1="L," it is determined that the level of the angular velocity signal has not been previously increased, and the process proceeds to Step S912. When, in Step S906, it is determined that the level of the angular velocity signal has been previously increased, then, in Step S907, a decrement flag 2 is loaded for checking whether or not the level of the angular velocity signal has been previously reduced. When the level of the angular velocity signal has been previously reduced, the decrement flag 2 is set to "H," whereas, when the level of the angular velocity signal has not been previously reduced, the decrement flag 2 is set to "L."

When, in Step S908, the flag 2 is used to determine whether or not the level of the angular velocity signal has been previously reduced, and when the flag 2="H" (that is, when the level of the angular velocity signal has been previously reduced), the process proceeds to Step S909. When the flag 2="L" (that is, when the level of the angular velocity signal has not been previously reduced), the process proceeds to Step S912. In Step S909, a number-of-vibrations counter N1 that counts the number of vibrations is loaded. In Step S910, "1" is added to the number-of-vibrations counter N1. Then, the process proceeds to Step S911 to reset the increment flag 1 and the decrement flag 2, thereby ending the process.

When, in Step S906, it is determined that the increment flag 1 is not "H," and, when, in Step S908, it is determined that the decrement flag 1 is not "H," that is, when it is determined that the level of the angular velocity signal has not been previously increased or reduced, the process proceeds to Step S912.

Here, angular velocity data ω−1 for one previous sample (previous processing) is loaded, and the process proceeds to Step S913 to load current angular velocity data ω detected by the angular velocity detecting unit 1.

In Step S914, a threshold value level "a" that is in correspondence with the amount of change for determining whether or not there is an increase or a decrease in the level of the angular velocity data in one sampling period is loaded. On the basis of the threshold value level "a" and the sampling time, it is possible to set a value that is in correspondence with the frequency and amplitude.

In Step S915, the absolute value of the amount of change of the level of the angular velocity data in one sampling period is compared with the threshold value level "a". If the absolute value of the amount of change has not reached the threshold value level a, the process proceeds to Step S924 to end the process. If the absolute value of the amount of change has become greater than or equal to the threshold value level "a," the process proceeds to Step S916 to determine whether or not the amount of change in the angular velocity in the one sampling period is positive (has increased) or is negative (has decreased). If it is positive, the process proceeds to Step S917 to set the increment flag 1 to "H." If it is not positive (that is, has decreased), the process proceeds to Step S918 to set the decrement flag 2 to "H." Then, the process proceeds to Step S924 to end the process.

When, in the aforementioned Step S903, the count value of the clock counter t has reached the frequency detection time T, the process proceeds to Step S919 to load the number-of-vibrations counter N1. Then, in Step S920, the number of vibrations N1 is divided by the detection time T, to determine the number of vibrations (vibration frequency F) in unit time (one second).

Next, in Step S921, the number-of-vibrations counter N1 is set to 0. Then, in Step S922, the clock counter t is set to 0. Thereafter, in Step S923, the vibration frequency F is stored in a predetermined storage area. Then, the process proceeds to Step S904. The subsequent operations are the same as those described above. In this way, it is possible to detect the frequency that is in correspondence with amplitude by setting the threshold value level "a."

Figure 6:
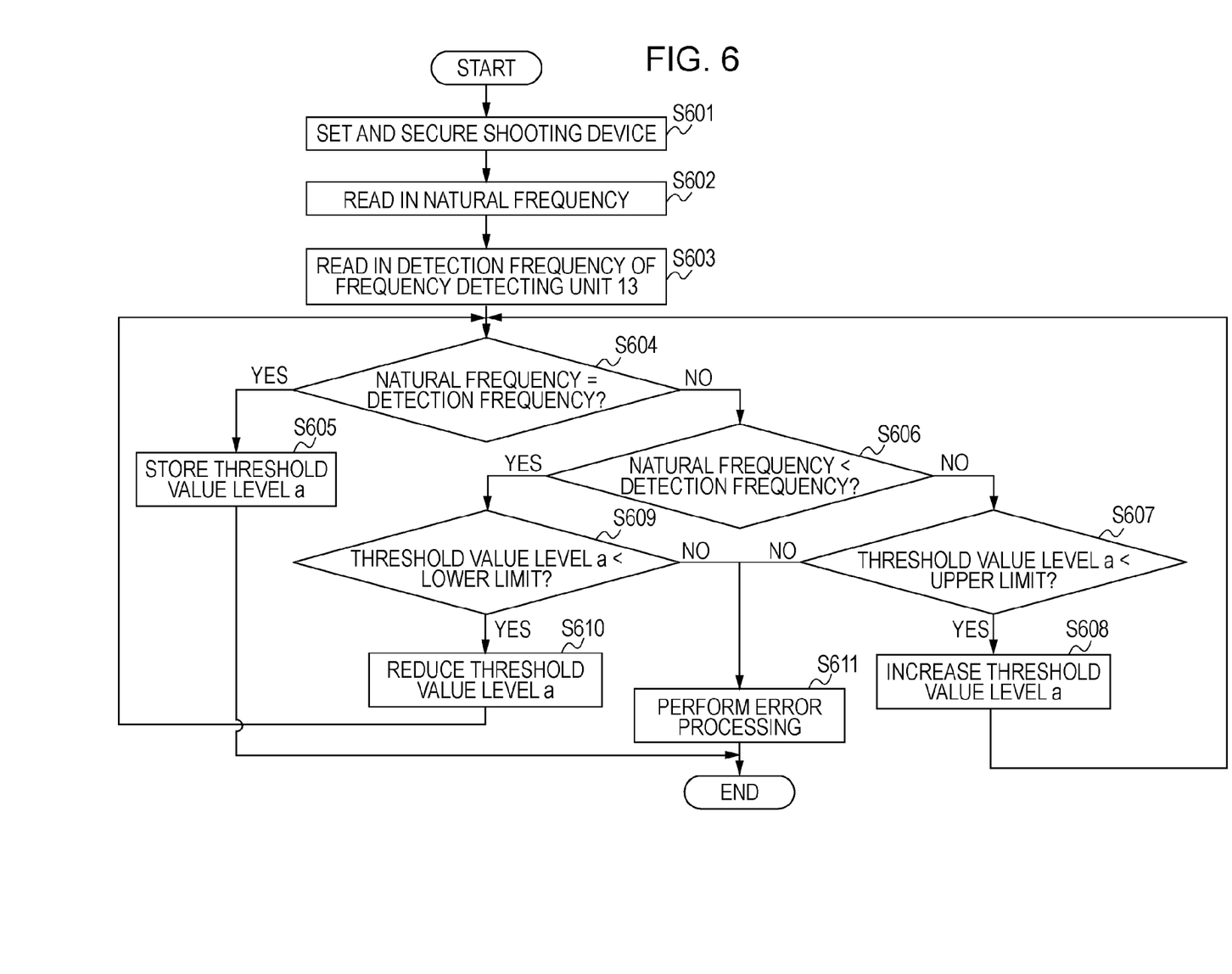
FIG. 6 is a flowchart of operations in the Example 2 of the present invention.

Next, the flow of a setting and an adjustment operation will be described with reference to FIG. 6. In Step S601, a shooting device is set and secured in a predetermined environment. In Step S602, a previously measured natural vibration frequency of the shooting device is read. In Step S603, an output frequency of the frequency obtaining unit 13 is read. In Step S604, a detection frequency is compared with the natural vibration frequency to determine whether it is equal to the natural vibration frequency. If it is not equal to the natural vibration frequency, the process proceeds to Step S606. If, in Step S606, the natural vibration frequency is greater than the detection frequency, the process proceeds to Step S607.

In Step S607, the threshold value level "a" is compared with a predetermined value. If it is less than the predetermined value, the process proceeds to Step S608 to increase the threshold value level "a". Then, the process returns to Step S604. If it is greater than the predetermined value, an error processing operation is performed in Step S611. The predetermined value at this time is an upper limit value. If, in Step S606, the natural vibration frequency is compared with the detection frequency, and is less than the detection frequency, the process proceeds to Step S609.

When, in Step S609, the threshold value level "a" is compared with a predetermined value, and is greater than the predetermined value, the process proceeds to Step S610 to reduce the threshold value level "a". Then, the process returns to Step S604. If it is less than the predetermined value, an error processing operation is performed in Step S611. The predetermined value at this time is a lower limit value. By setting the upper limit value and the lower limit value as the predetermined values, and comparing them with the threshold value level "a" in Steps S607 and S609, it is possible to prevent the process from not ending indefinitely when the shooting device is not actually vibrating or is vibrating abnormally.

If, in Step S604, the natural vibration frequency is equal to the detection frequency, then, in Step S605, the threshold value level "a" at this time is stored. Although, in Step S604, it is determined whether the natural vibration frequency is equal to the detection frequency, it may be determined whether the natural vibration frequency is equivalent to the detection frequency. How the determination is carried out is determined in accordance with a performance and precision of the apparatus, so that, obviously, there may be a certain tolerance.

Here, the error processing operation in Step S611 may be, for example, an operation indicating that the adjustment is not properly performed or an operation in which the threshold value level a is written as the predetermined value. Therefore, the error processing operation is not particularly limited in type. These operations may be manually or automatically performed.

Accordingly, in the embodiment, by providing the threshold value level setting unit 15 that sets the threshold value level a of the frequency obtaining unit 13, it is possible to more precisely detect vibration at a particular frequency applied to the image pickup apparatus at a location where the shooting device is set.

While the present invention has been described with reference to examples, it is to be understood that the invention is not limited to the disclosed examples. The scope of the following claims is to be accorded the broadest interpretation so as to encompass all modifications and equivalent structures and functions.

This application claims the benefit of Japanese Patent Application No. 2008-175912 filed Jul. 4, 2008, which is hereby incorporated by reference herein in its entirety.

What is claimed is:

1. A vibration correcting device comprising:
 a vibration detecting unit configured to detect vibration of an image pickup apparatus;
 a vibration correcting unit configured to correct blur of an image caused by the vibration;
 a storage unit configured to store correction information used for correcting the blur at a predetermined frequency;
 a controlling unit configured to send a control signal to the vibration correcting unit on the basis of the correction information; and
 a frequency obtaining unit configured to obtain information regarding a frequency of an output from the vibration detecting unit using a threshold value and the output from the vibration detecting unit; and
 an adjustment unit configured to adjust the threshold value to detect the predetermined frequency, wherein
 in a case where the frequency of the output of the vibration detecting unit is smaller than the predetermined frequency, the threshold value becomes smaller, and
 in a case where the frequency of the output of the vibration detecting unit is larger than the predetermined frequency, the threshold value becomes larger.

2. The vibration correcting device according to claim 1, wherein the predetermined frequency is a natural vibration frequency of the image pickup apparatus.

3. The vibration correcting device according to claim 1, wherein the image pickup apparatus is used while being secured to an external portion, and wherein the predetermined frequency is a frequency of vibration applied to the external portion.

4. The vibration correcting device according to claim 1, wherein the storage unit includes a plurality of pieces of the correction information for a plurality of frequencies, and wherein the controlling unit sends the control signal to the vibration correcting unit on the basis of one of the plurality of the pieces of the correction information.

5. The vibration correcting device according to claim 1, wherein the threshold value is set to a value greater than a predetermined lower limit value and less than a predetermined upper limit value.

6. An image pickup apparatus comprising:
the vibration correcting device according to claim 1; and
an image pickup device.

7. A method comprising:
detecting vibration of an image pickup apparatus;
correcting blur of an image caused by the detected vibration by a vibration correction unit;
storing correction information used for correcting the blur at a predetermined frequency;
sending a control signal to the vibration correction unit on the basis of the correction information;
obtaining information regarding a frequency of an output from the vibration correction unit using a threshold value and the output from the vibration correction unit; and
adjusting the threshold value to detect the predetermined frequency, wherein
in a case where the detected vibration is smaller than the predetermined frequency, the threshold value becomes smaller, and
in a case where the detected vibration is larger than the predetermined frequency, the threshold value becomes larger.

8. The method according to claim 7, further comprising setting the threshold value to a value greater than a predetermined lower limit value and less than a predetermined upper limit value.

9. An optical apparatus comprising:
a driving unit configured to change a shooting state;
a vibration detecting unit to detect vibration;
a vibration correcting unit;
a shooting state detecting unit configured to obtain information about the shooting state;
a storage unit configured to store correction information corresponding to the detected vibration;
a controlling unit configured to send a control signal to the vibration correcting unit on the basis of the correction information;
obtaining information regarding a frequency of an output from the vibration correction unit using a threshold value and the output from the vibration correction unit; and
adjusting the threshold value to detect the predetermined frequency, wherein
in a case where the frequency of the output of the vibration detecting unit is smaller than the predetermined frequency, the threshold value becomes smaller, and
in a case where the frequency of the output of the vibration detecting unit is larger than the predetermined frequency, the threshold value becomes larger.

10. The optical apparatus according to claim 9, a driving unit configured to change the shooting state from a stationary state to a panning state or a tilting state.

* * * * *